G. CONDERMAN.
VEHICLE SPRING.
APPLICATION FILED JAN. 15, 1909.
1,017,512.
Patented Feb. 13, 1912.
2 SHEETS—SHEET 1.
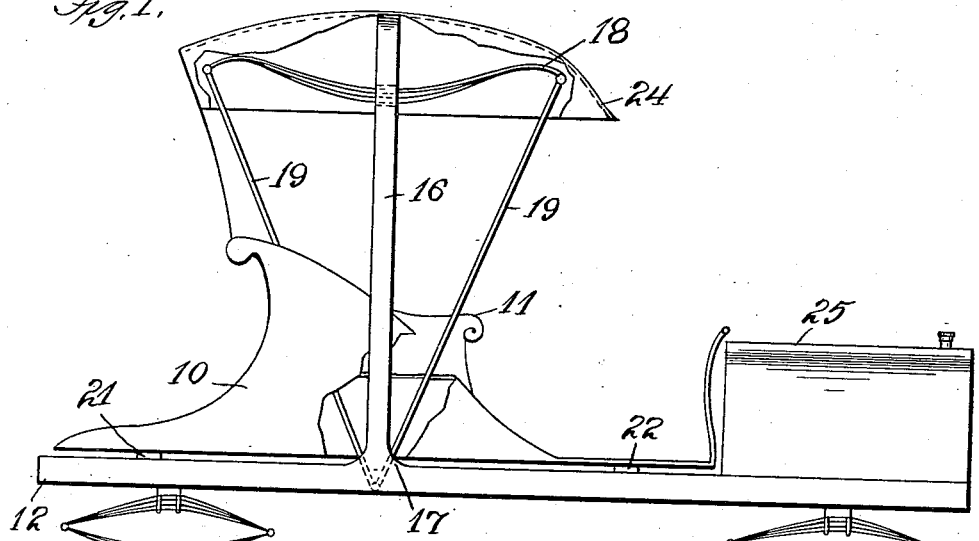
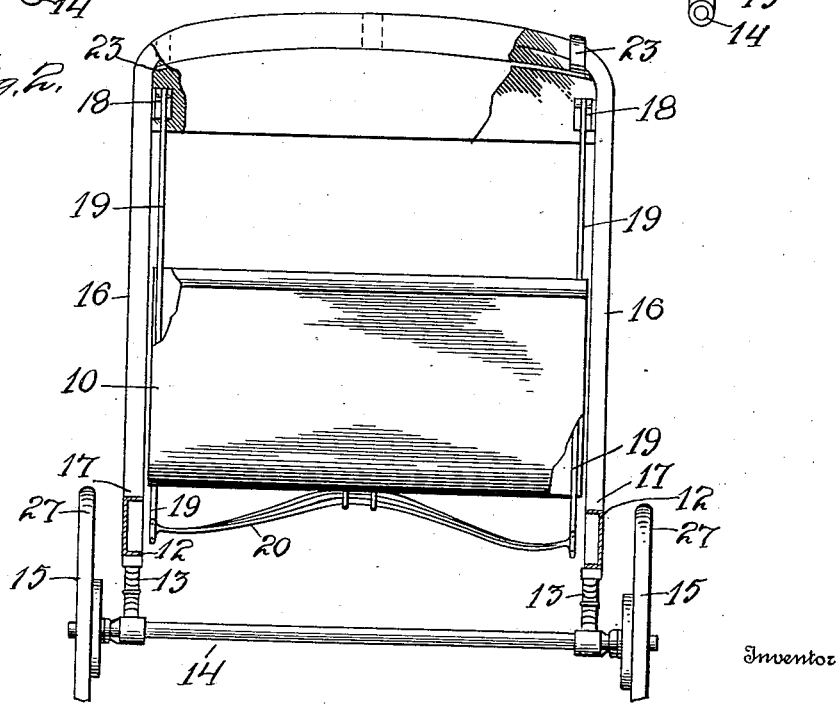
Witnesses
J. A. Ellsworth
Erastus Crosby
Inventor
George Conderman
By S. Arthur Baldwin,
Attorney G. CONDERMAN.
VEHICLE SPRING.
APPLICATION FILED JAN. 15, 1909.
1,017,512.
Patented Feb. 13, 1912.
2 SHEETS—SHEET 2.
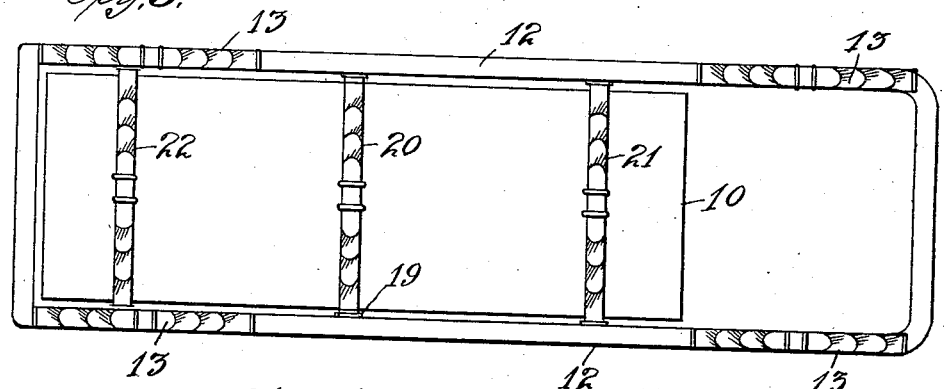
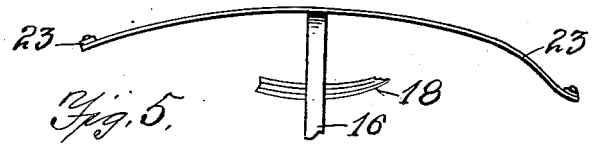
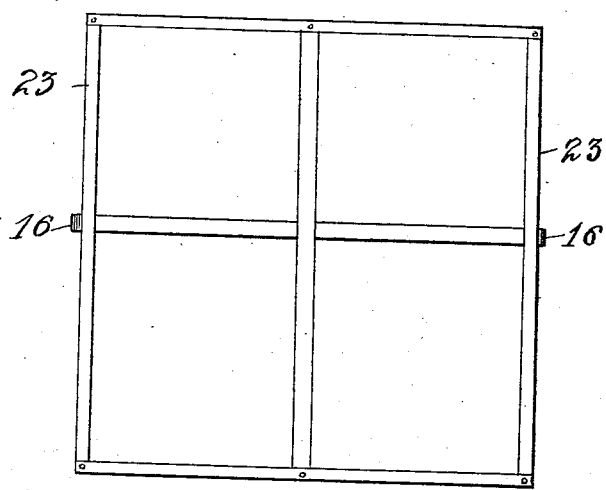
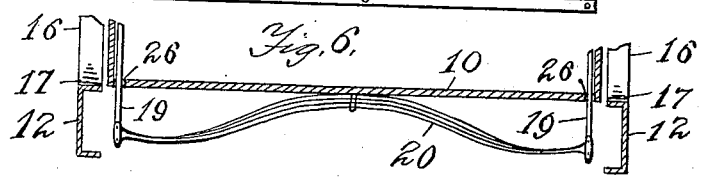
Witnesses
Inventor
George Conderman
By J. Arthur Baldwin.
Attorney

UNITED STATES PATENT OFFICE.

GEORGE CONDERMAN, OF HORNELL, NEW YORK.

VEHICLE-SPRING.

1,017,512.     Specification of Letters Patent.     Patented Feb. 13, 1912.

Application filed January 15, 1909. Serial No. 472,408.

*To all whom it may concern:*

Be it known that I, GEORGE CONDERMAN, a citizen of the United States, residing at Hornell, in the county of Steuben and State of New York, have invented certain new and useful Improvements in Vehicle-Springs, of which the following, taken in connection with the accompanying drawing, is a full, clear, and exact description.

The invention relates to spring gears for vehicles and particularly to automobiles; and the object of the improvement is to provide such a novel arrangement of the frame and springs as will give a high degree of resiliency to the body of the vehicle, and toward this end the springs are so arranged that the impulse from jolts or jars has to travel through a number of widely separated springs; the distance the impulse from the jolt has to travel aiding in the resilient control and the different springs each sharing a portion of said impulse.

The novelty consists in the combination and arrangement of the parts, as shown in this specification and drawings and pointed out in the claims.

In the drawings, Figure 1 is a side elevation of an automobile frame and body, showing a new arrangement of the same and of the springs; and Fig. 2 is a rear elevation of the same, parts of the top and body being broken away to show the construction of the frame and springs. Fig. 3 is a plan view of the under side of the frame and body of the automobile, the axles and wheels being removed. Fig. 4 is a detail side elevation of the frame for the vehicle top; and Fig. 5 is a plan view of said frame for the top. Fig. 6 is a sectional view of the bottom of the body of the vehicle and the frame at the rear of the upright standards showing the attachment of the lower end of the connecting links with the spring on the bottom of the body.

Similar numerals refer to corresponding parts in the several views.

The numeral 10 indicates the automobile box or body having the seat 11 therein. The numeral 12 indicates the automobile frame which is preferably made of angle steel preferably rectangular in form so as to be as strong and light as possible. Frame 12 is supported in the usual manner upon front and rear springs 13 at each side, which bear upon front and rear axles 14, said axles having suitable wheels 15 revolubly mounted thereon.

An upright arching frame 16 is provided on frame 12 which is in the form of a bow for a vehicle top. Frame 16 is preferably made of angle or strip steel, of great strength and attached rigidly to the frame 12 at 17 at each side. A pair of leaf springs 18 are attached to frame 16 preferably on the inner side near the upper end of the uprights at each side of said frame. Springs 18 are attached to frame 16 near their central portion, preferably extending about equal to the front and rear of said frame, though such equalization is not absolutely necessary in my construction. The outer ends of springs 18 are pivotally attached to connecting rods or links 19, which are preferably extended down through slotted openings 26 in the body 10 in order to assist in holding the same steady. Said slotted openings are sufficiently protected against wear, and allow sufficient play for said rods so as not to disturb unduly the action of body 10. The lower ends of connecting links 19 are attached to the opposite ends of a strong leaf spring 20, which is attached to the under side of the body 10. An additional pair of leaf springs 21 and 22 are provided near the front and rear end of body 10, attached directly to body 10 at their central portion and the outer ends are attached to the frame 12, as shown in Fig. 3. Springs 21 and 22 are soft or exceptionally resilient springs and the office of springs 21 and 22 is to steady the motion of the body 10 so that the body can not take any erratic movement, but is held steadily in place thereby. A frame 23 is provided on the top of frame 16 for supporting the top covering 24. An engine 25 is provided on the front of the frame 12 and having suitable driving gear to run the machine.

The jolts and jars proceed almost entirely from the wheels 15 passing over rough places. It is apparent that the heavy springs 13 will absorb a large portion of such jolts. That portion of the impulse of said jolts which passes to the frame 12 from spring 13 has to travel along frame 12 then up vertical frame 16 and out upon springs 18. Springs 18 take a portion of said impulse, then the impulse passes down links 19 to the resilient spring 20 beneath the center of body 10. Spring 20 absorbs still more of said impulse, so that by the time the impulse reaches the body 10 and the occupants of the car, the impulse of the jolt or jar is almost entirely overcome.

One of the largest expenses in the present automobile construction and maintenance is the cost of the pneumatic tires. It is purposed by this resilient spring gear and frame construction to so overcome the jolt or jar incident to rough roads as that solid or cushioned tires 27 may be used on wheels 15 with a degree of comfort heretofore only obtained by pneumatic tires.

It is apparent that this method of support for the vehicle body could be applied to a seat alone without supporting a large body, as for example, an automobile body, without departing from my invention. The only change in the construction necessary being the application of the leaf spring 20 on the bottom of the vehicle body to the under side of the seat.

I claim as new:

1. A vehicle frame comprising strip metal in rectangular form for a supporting platform, strip metal in the form of an arch attached to said platform at each side, leaf springs on said arch, and a vehicle body supported by said leaf springs.

2. A vehicle comprising a horizontal portion to form a supporting platform, an upright portion in the form of an arch rigidly attached to said horizontal portion at each side, a vehicle body, leaf springs on said upright portion a leaf spring on the under side of said vehicle body and attached thereto, and connecting rods from said leaf springs on said upright portion to said leaf spring on said vehicle body.

3. A vehicle comprising a horizontal supporting frame portion, an upright arch portion attached to said horizontal portion at each side, a top frame on said upright portion, leaf springs on said upright portion, a vehicle body having a leaf spring on its under side, and connecting rods from said springs on said upright portion to the opposite ends of said body spring to support said body.

4. A vehicle comprising a horizontal frame portion 12, an upright arch portion 16 on said horizontal portion, a top frame 23 on said upright portion, leaf springs 18 attached to the opposite sides of said upright portion, a body 10, a leaf spring 20 on said body, and connecting rods 19 attaching said leaf springs, substantially as shown.

5. A vehicle comprising a vehicle body 10, a supporting frame 12 for said body, vehicle springs 13 on said frame, axles 14 supporting said vehicle, wheels 15 on said axles, an upright frame 16 on said supporting frame, leaf springs 18 on said upright frame at each side, connecting rods 19 at each end of said leaf spring, a leaf spring 20 on said vehicle body and attached to the lower ends of said connecting rods at each side, additional leaf springs 21 and 22 on said body and frame to steady said body, and a top supporting frame 23 on said upright having a suitable top thereon, substantially as and for the purpose specified.

In testimony whereof I have signed my name to this specification in the presence of two subscribing witnesses.

GEORGE CONDERMAN.

Witnesses:
 JAS. T. FOODY,
 J. J. BUNDY.